US012811254B2

(12) United States Patent
Oga et al.

(10) Patent No.: US 12,811,254 B2
(45) Date of Patent: Nov. 24, 2026

(54) BUSBAR MODULE AND BUSBAR MODULE ATTACHMENT METHOD

(71) Applicant: Yazaki Corporation, Tokyo (JP)

(72) Inventors: Tatsuya Oga, Makinohara (JP); Hirotaka Mukasa, Makinohara (JP); Daiki Tanaka, Fujieda (JP); Seigo Mochizuki, Fujieda (JP); Yoshiki Aoshima, Makinohara (JP); Taiki Unno, Fujieda (JP)

(73) Assignee: Yazaki Corporation, Tokyo (JP)

( * ) Notice: Subject to any disclaimer, the term of this patent is extended or adjusted under 35 U.S.C. 154(b) by 502 days.

(21) Appl. No.: 18/521,595

(22) Filed: Nov. 28, 2023

(65) Prior Publication Data

US 2024/0178527 A1 May 30, 2024

(30) Foreign Application Priority Data

Nov. 29, 2022 (JP) ................................ 2022-190350

(51) Int. Cl.
*H01M 50/507* (2021.01)
*H01M 50/474* (2021.01)
*H01M 50/514* (2021.01)

(52) U.S. Cl.
CPC ....... *H01M 50/507* (2021.01); *H01M 50/474* (2021.01); *H01M 50/514* (2021.01)

(58) Field of Classification Search
CPC . H01M 50/474; H01M 50/507; H01M 50/514
See application file for complete search history.

(56) References Cited

U.S. PATENT DOCUMENTS

2018/0175346 A1* 6/2018 Schmid-Schoenbein .................... H01M 50/553
2021/0273299 A1 9/2021 Okazaki

* cited by examiner

*Primary Examiner* — Jonathan G Jelsma
(74) *Attorney, Agent, or Firm* — Sughrue Mion, PLLC

(57) ABSTRACT

A busbar module that can be brought into a folded state and a busbar module attachment method. The busbar module includes a case configured to be installed on the battery assembly, a plurality of busbars supported by the case and configured to be respectively connected to single cells, and a routing material electrically connected to the busbars and routed in the case. The case includes a plurality of divided cases that are divided in a direction in which the single cells are arranged, and a connection structure connecting adjacent divided cases of the divided cases with each other. The connection structure displaces the divided cases into a folded state in which the divided cases are rotated so that adjacent divided cases overlap each other and an expanded state in which the divided cases are situated on a same plane.

11 Claims, 10 Drawing Sheets

BUSBAR MODULE AND BUSBAR MODULE ATTACHMENT METHOD

TECHNICAL FIELD

The present invention relates to a busbar module and a busbar module attachment method.

BACKGROUND

Conventionally, power supply devices installed in various vehicles, such as an electric vehicle that travels using an electric motor and a hybrid vehicle that travels using both an engine and an electric motor, have busbar modules attached to a battery assembly consisting of multiple single cells (for example, see Patent Document 1).

RELATED ART

Patent Document

[Patent Document 1] JP 2021-136162 A

SUMMARY OF THE INVENTION

Problem to be Solved by the Invention

However, due to an increase in the amount of electric power required by an electric motor, for example, the number of single cells constituting a conventional power supply device has increased, and a busbar module constituting the conventional power supply device tends to increase in size in the direction in which the single cells are arranged (i.e., longitudinal direction). Furthermore, when the busbar module becomes larger, the packaging size becomes larger, which may increase transportation costs, for example.

It is an object of the present invention to provide a busbar module that can be brought into a folded state and a busbar module attachment method.

Solution to Problem

In order to achieve the above object, a first aspect of an embodiment of the present invention is a busbar module configured to be attached to a battery assembly including a plurality of single cells, including: a case configured to be installed on the battery assembly; a plurality of busbars supported by the case and configured to be respectively connected to the plurality of single cells; and a routing material electrically connected to the busbars and routed in the case, wherein the case includes: a plurality of divided cases that are divided in a direction in which the single cells are arranged; and a connection structure rotatably connecting adjacent divided cases of the plurality of divided cases with each other, and wherein the connection structure is configured to displace the plurality of divided cases into: a folded state in which the divided cases are rotated so that the adjacent divided cases of the plurality of divided cases overlap each other; and an expanded state in which the plurality of divided cases are situated on a same plane.

Advantageous Effects of the Invention

According to the first aspect of the embodiment of the present invention, the busbar module can be brought into a folded state in which multiple divided cases overlap each other.

DETAILED DESCRIPTION OF THE EXEMPLARY EMBODIMENT

Figure 1:
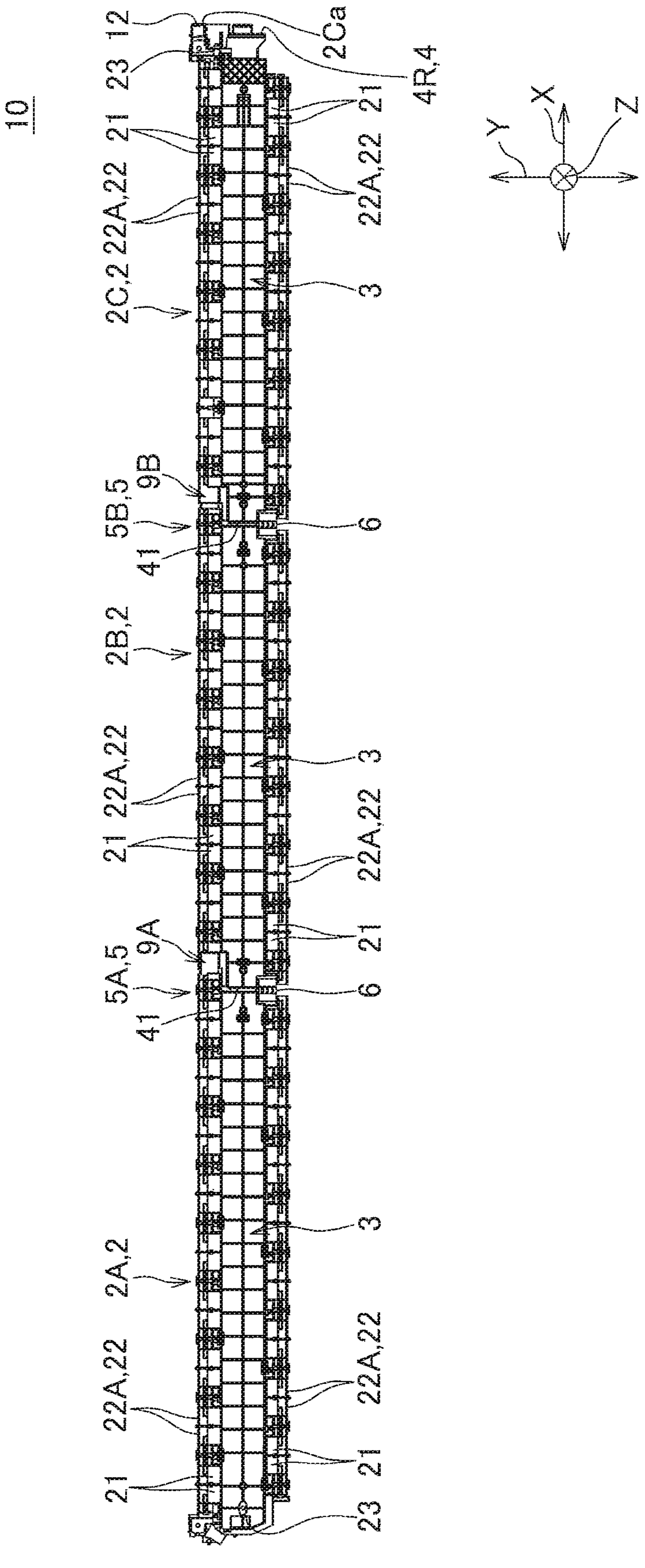
FIG. 1 is a top view illustrating a busbar module according to an embodiment of the present invention, illustrating the busbar module in an expanded state.
Figure 2:
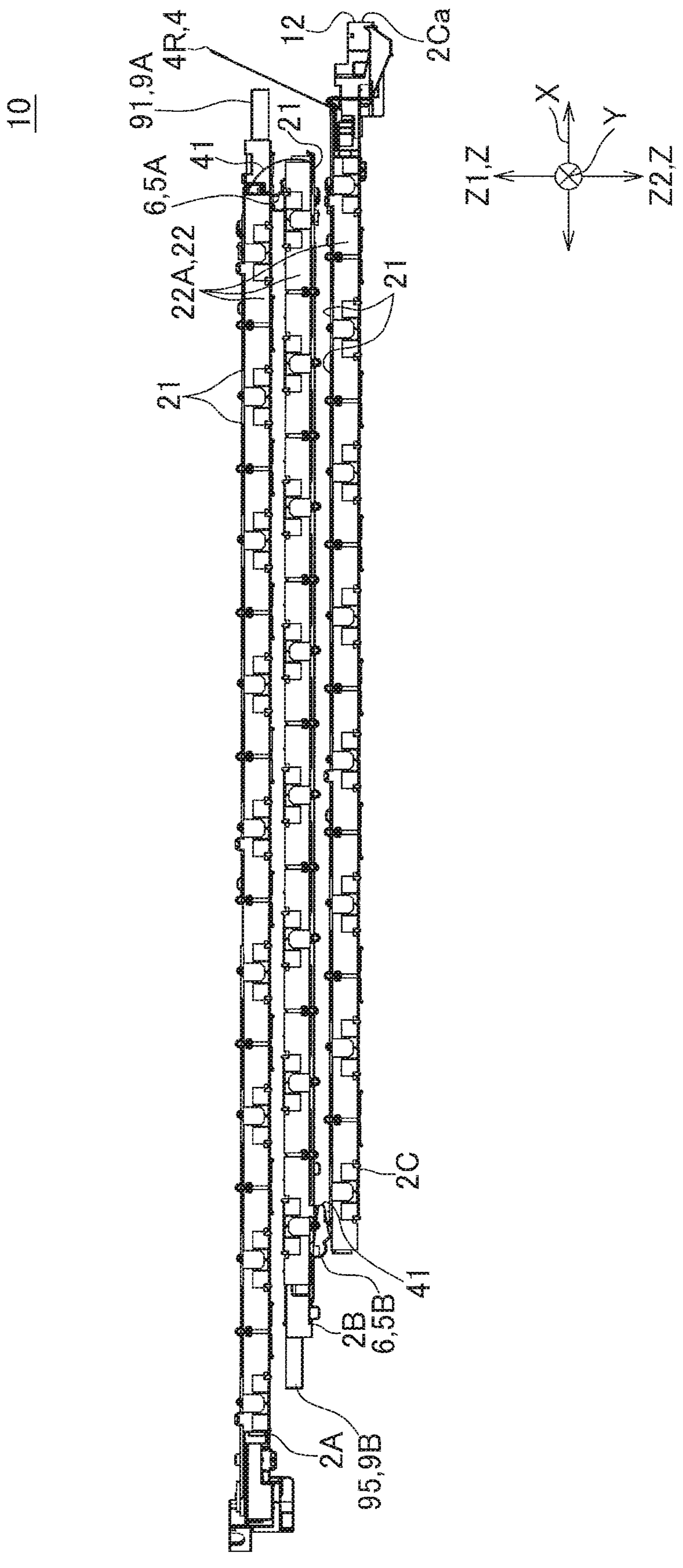
FIG. 2 is a side view illustrating the busbar module in a folded state.
Figure 3:
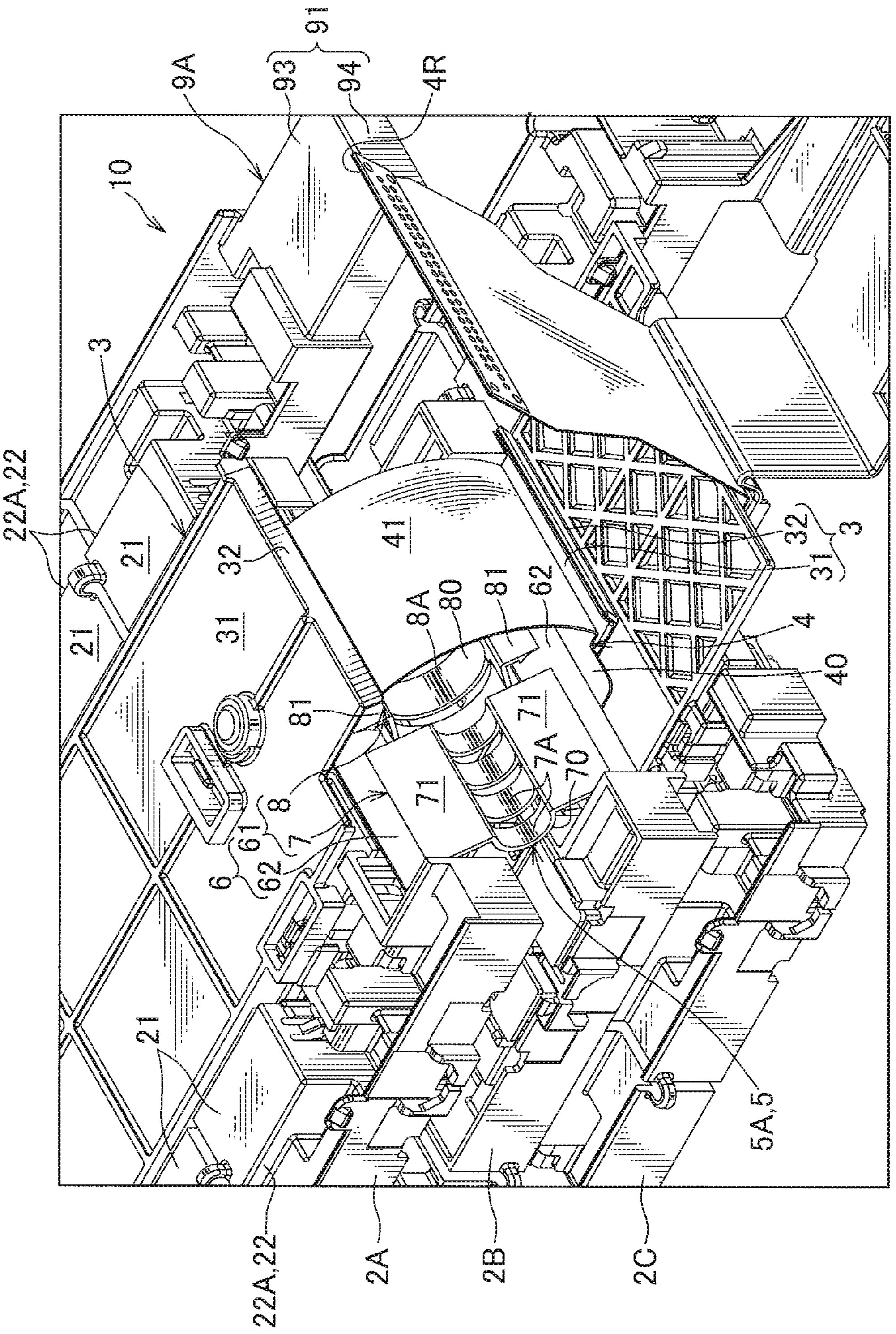
FIG. 3 is an enlarged perspective view illustrating the main portion of the busbar module in the folded state.

An embodiment of the present invention will be described below with reference to FIGS. 1 to 9. FIG. 1 is a top view illustrating a busbar module 10 according to an embodiment of the present invention, illustrating the busbar module 10 in an expanded state. FIG. 2 is a side view illustrating the busbar module 10 in a folded state. FIG. 3 is an enlarged perspective view illustrating the main portion of the busbar module 10 in the folded state. The busbar module 10 according to the present embodiment is attached on the top surface of a battery assembly (not illustrated) to constitute a power supply device. The power supply devices are installed in various vehicles, such as an electric vehicle that travels using an electric motor and a hybrid vehicle that travels using both an engine and an electric motor, and supply power to the electric motor.

The battery assembly includes multiple single cells. Each single cell includes a single cell body formed in the shape of a rectangular parallelepiped, and a pair of electrodes provided on the upper surface of the single cell body. One of the electrodes constituting the pair is positive, and the other is negative. The positive electrode is provided at one end of the top surface of the single cell body, and the negative electrode is provided at the other end of the top surface of the single cell body. These multiple single cells are provided overlapping in one direction (X direction) and are connected in series by the busbar module 10, which will be described later.

In the present embodiment, the longitudinal direction of the busbar module 10, which is the direction in which the single cells constituting the battery assembly overlap, may be referred to as an "X direction", the direction in which the electrodes constituting the pair face each other and which is the width direction of the busbar module 10 may be referred to as a "Y direction", and the direction perpendicular to the X direction and the Y direction may be referred to as a "Z direction". Furthermore, in the Z direction, a side closer to the reader in the direction perpendicular to the page in FIG. 1 may be referred to as an "upper side Z1", and the direction opposite to the upper side Z1 (a side farther from the reader in the direction perpendicular to the page in FIG. 1) that is the battery assembly side as seen from the busbar module 10 may be referred to as a "lower side Z2".

The busbar module 10 is attached to the upper surface of the battery assembly, and includes, as illustrated in FIGS. 1, 2, three divided cases 2A, 2B, 2C (2), busbars (not illustrated) supported by the divided cases 2 and connected to the respective single cells, flexible printed circuits 4 (FPCs, routing materials) connected to the busbars and routed to extend through the divided cases 2A, 2B, 2C, and a pair of connection structures 5, 5 rotatably connecting adjacent ones of divided cases 2A, 2B, 2C with each other. The divided cases 2A, 2B, 2C and the pair of connection structures 5, 5 constitute a case 12 (illustrated in FIGS. 1 and 2).

As illustrated in FIGS. 1, 2, this busbar module 10 is configured to be in two states, i.e., an expanded state (illustrated in FIG. 1) in which the three divided cases 2A, 2B, 2C are situated on the same plane and a folded state (illustrated in FIG. 2) in which the three divided cases 2A, 2B, 2C overlap in the upper-and-lower direction Z. As illustrated in FIG. 1, when the busbar module 10 is in the expanded state, the first divided case 2A, the second divided case 2B, and the third divided case 2C are arranged in this order along the longitudinal direction X of the busbar module 10.

Each of the divided cases 2 is made of insulating synthetic resin. As illustrated in FIG. 1, each of the divided cases 2 includes a pair of busbar accommodating row portions 22, 22 in which multiple busbar accommodating portions 22A are arranged in two rows: insulating covers 21 covering the busbars accommodated in the respective busbar accommodating portions 22A: FPC routing portions 23: and a FPC cover 3 (routing material cover) supported by the FPC routing portion 23 to cover a FPC portion 40. The FPC routing portion 23 is situated between the busbar accommodating row portions 22, 22 constituting the pair.

As illustrated in FIG. 3, the FPC cover 3 includes: a cover body 31 formed into a rectangular plate shape: and a FPC guiding portion 32 that is formed by bending, to the lower side Z2, the end portion of the cover body 31 in the longitudinal direction X. The cover body 31 is formed in such a size that can cover the FPC portion 40, which will be described later.

Figure 5:
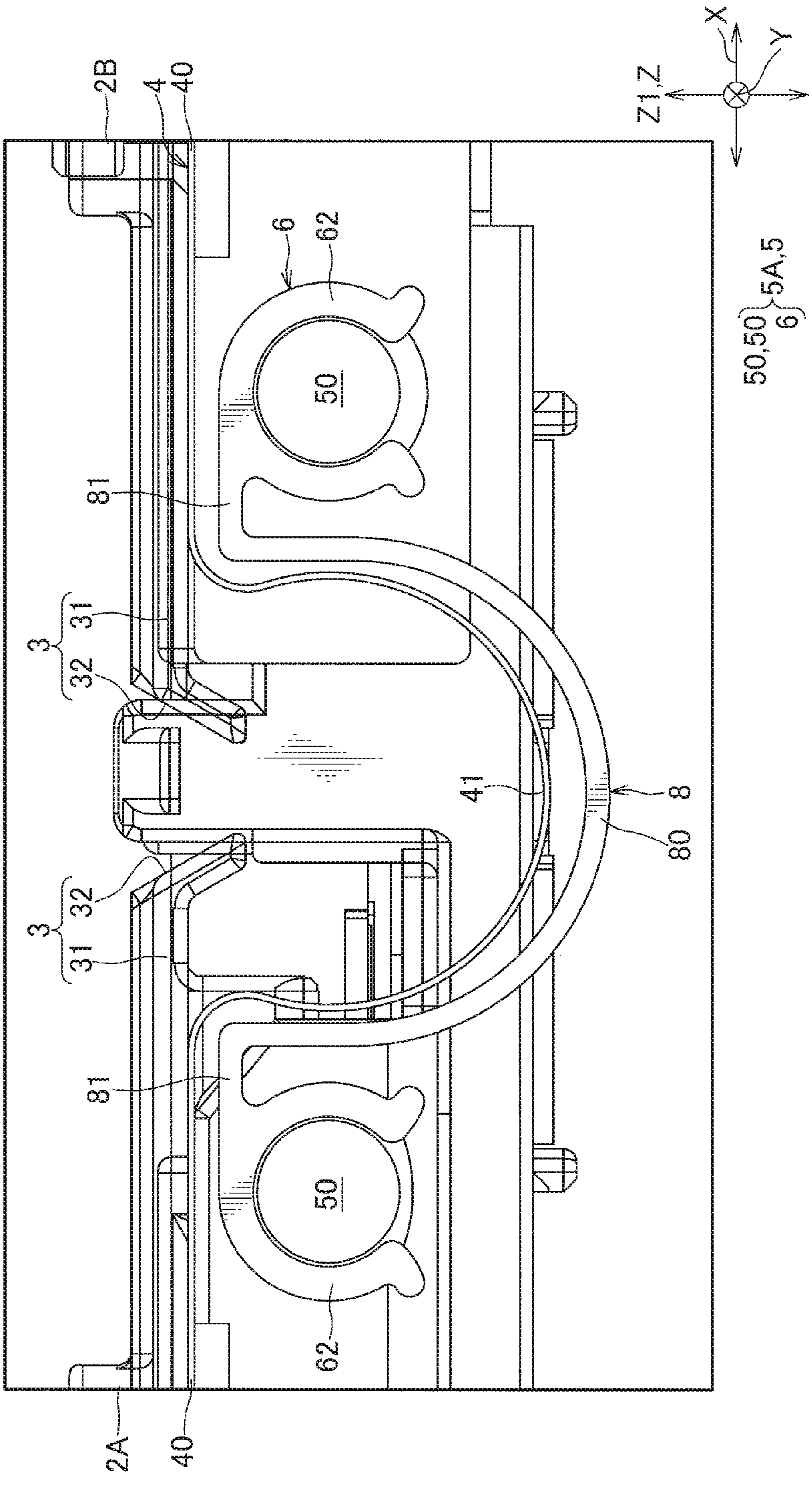
FIG. 5 is a cross-sectional view taken along line I-I of FIG. 4.
Figure 6A:
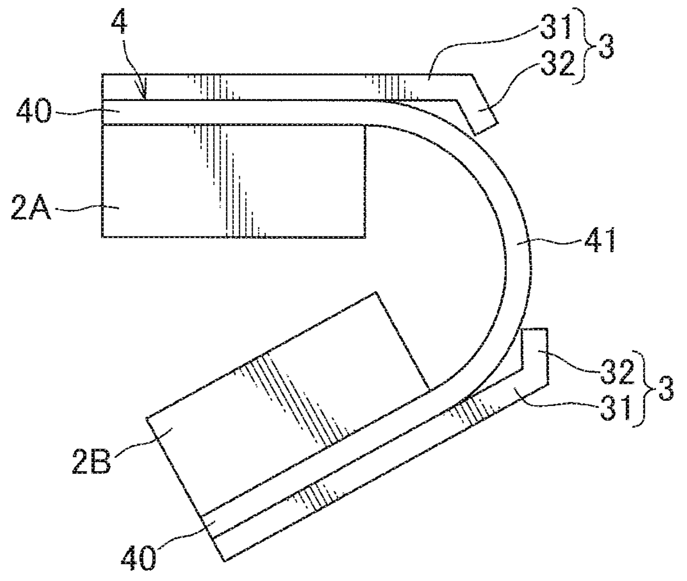
FIG. 6A is a conceptual diagram illustrating the folded state.
Figure 6B:
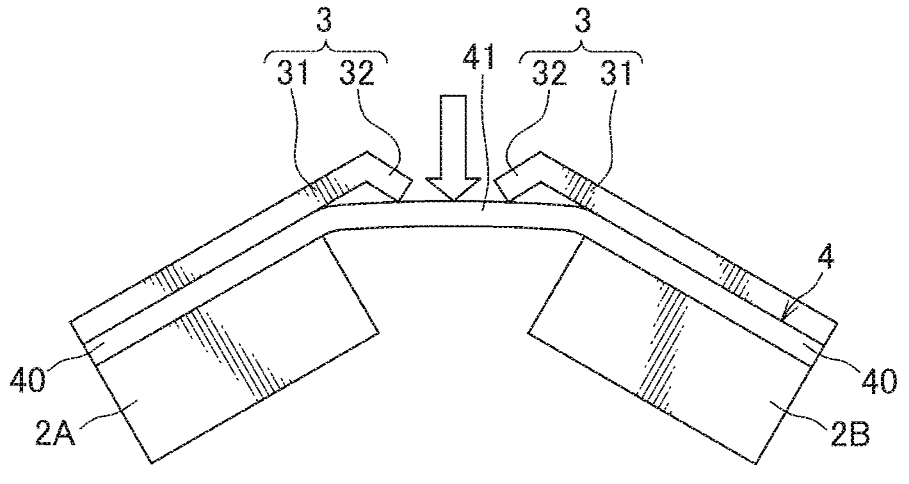
FIG. 6B is a conceptual diagram illustrating transition from the folded state to the expanded state.

As illustrated in FIG. 5 and FIGS. 6A and 6B, the FPC guiding portion 32 is provided at a position facing the FPC extra length portion 41 explained later and configured to curve a FPC extra length portion 41 to the lower side Z2 when the busbar module 10 displaces from the folded state to the expanded state. Specifically, as illustrated in FIGS. 6A and 6B, when the busbar module 10 displaces from the folded state to the expanded state, the FPC guiding portion 32 of the FPC cover 3 comes into contact with the FPC extra length portion 41, so that the FPC extra length portion 41 is pushed by the FPC guiding portion 32 to the lower side Z2 to curve toward the lower side Z2 to be accommodated in a FPC accommodating portion 8. According to this configuration, when the busbar module 10 displaces from the folded state to the expanded state, the FPC extra length portion 41 is prevented from being stuck between adjacent FPC covers 3. In FIG. 5, a hatch indicating a cross section is omitted.

As illustrated in FIGS. 1 and 5, the FPC 4 integrally includes three FPC portions 40, 40, 40 (only two FPC portions are illustrated in FIG. 5) routed through the divided cases 2 and a pair of FPC extra length portions 41, 41 (illustrated in FIG. 1) provided between adjacent FPC portions 40. As illustrated in FIG. 1, the FPC 4 is configured to have a length continuous from one end to the other end of the busbar module 10 in the longitudinal direction X and is routed to extend through the respective divided cases 2A, 2B, 2C. Also, the FPC 4 is connected to the respective busbars in each of the FPC portions 40, and one end 4R of the FPC 4 in the longitudinal direction X (illustrated in FIGS. 1 and 2) is connected to a control device, not-illustrated, equipped with a voltage monitoring unit detecting the voltage of each single cell and a temperature monitoring unit detecting the temperature of each single cell.

Each of the FPC portions 40 is configured to have such a length that allows the FPC portion 40 to be routed through the divided case 2, and is accommodated in the FPC routing portion 23 of the divided case 2 such that the FPC portion 40 faces the upper surface of the battery assembly.

One of the connection structures 5, 5 constituting the pair (which may be hereinafter referred to as a first connection structure 5A) rotatably connects the first divided case 2A and the second divided case 2B as illustrated in FIGS. 1 and 2, and the other of the connection structures 5, 5 constituting the pair (which may be hereinafter referred to as a second connection structure 5B) rotatably connects the second divided case 2B and the third divided case 2C as illustrated in FIGS. 1 and 2. The connection structures 5A and 5B constituting the pair have the same function or structure. Hereinafter, only the first connection structure 5A is explained, and detailed explanation about the second connection structure 5B is omitted.

Figure 4:
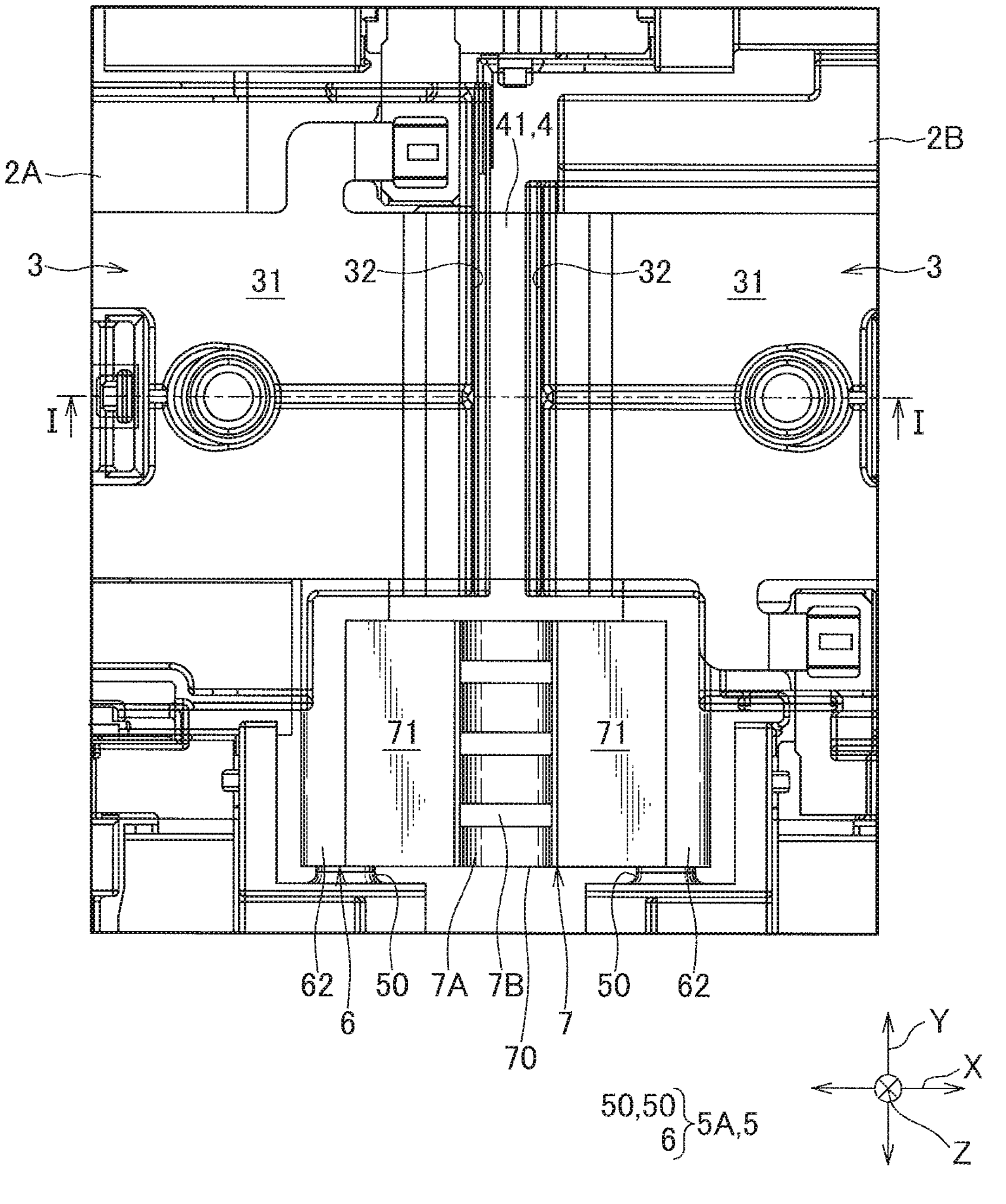
FIG. 4 is a top view illustrating a connection structure constituting the busbar module.

As illustrated in FIGS. 4 and 5, the first connection structure 5A, 5 includes: a pair of shafts 50, 50 formed in a cylindrical shape to extend in a width direction Y of the busbar module 10; and a connecting portion 6 pivotally supported by the pair of shafts 50, 50.

As illustrated in FIG. 4, one of the shafts 50, 50 constituting the pair is supported by the first divided case 2A to extend in the width direction Y of the busbar module 10, and the other of the shafts 50, 50 constituting the pair is supported by the second divided case 2B to extend in the width direction Y.

Figure 7A:
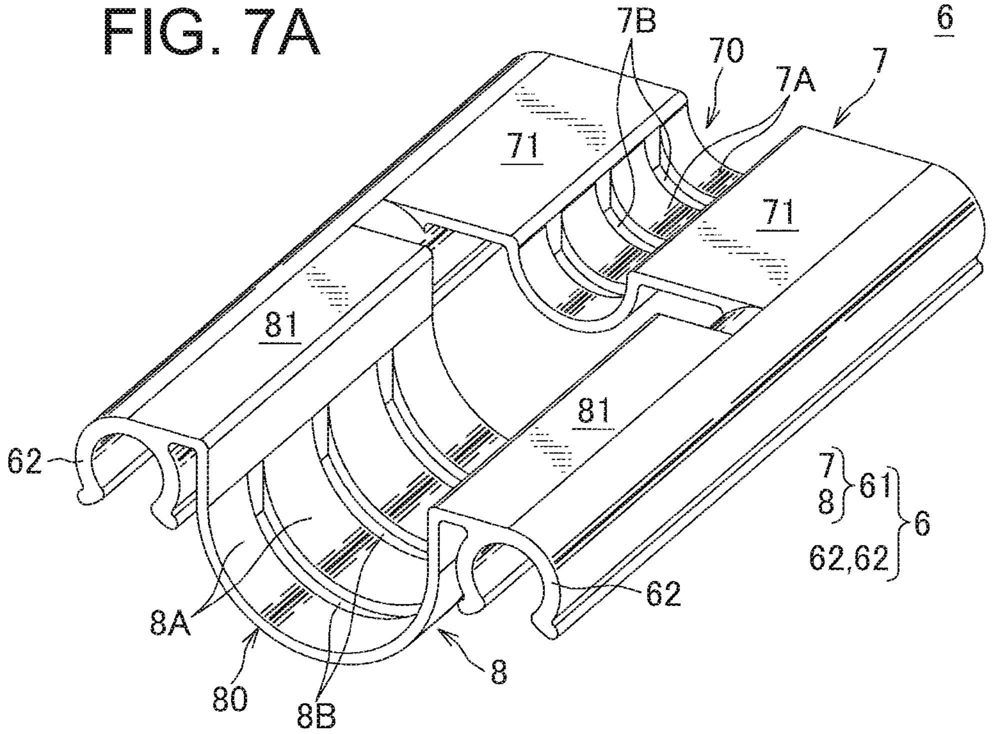
FIG. 7A is a perspective view illustrating a connection portion constituting the connection structure.
Figure 7B:
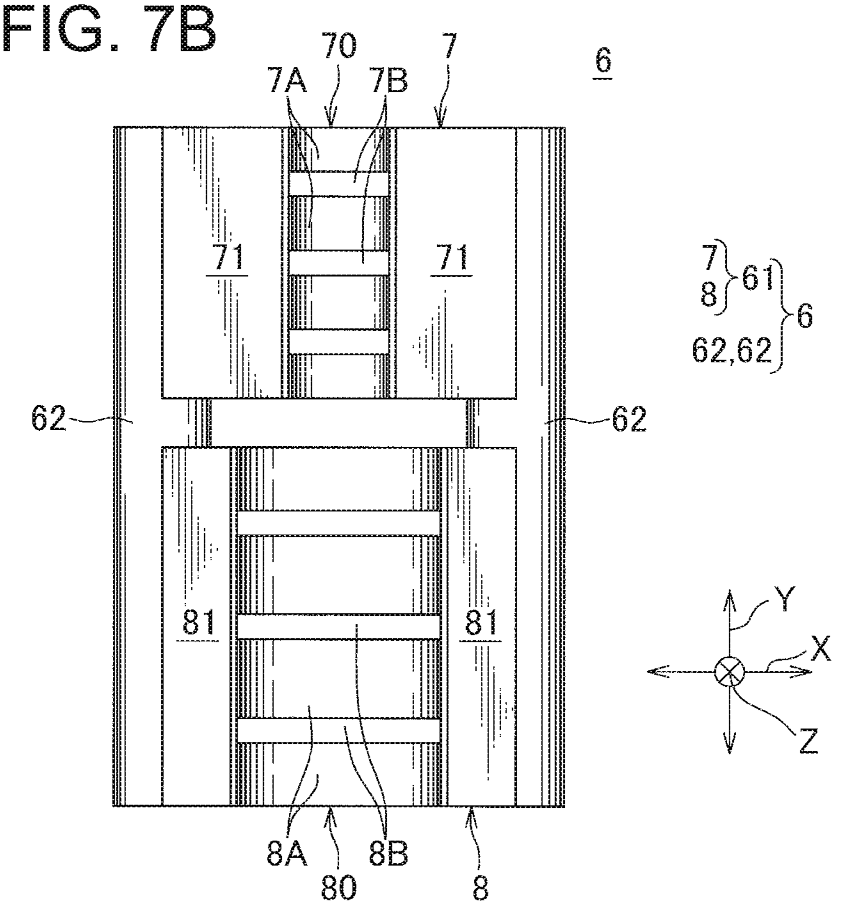
FIG. 7B is a top view illustrating the connection portion constituting the connection structure.

FIGS. 7A and 7B, the connecting portion 6 includes: a connecting portion body 61 in a rectangular shape in a top view; and a pair of shaft support portions 62, 62 provided on both end portions of the connecting portion body 61 to pivotally support the pair of shafts 50, 50.

As illustrated in FIGS. 7A and 7B, the connecting portion body 61 integrally includes: a pitch absorbing portion 7 formed to be elastically deformable in the longitudinal direction X of the busbar module 10; and a FPC accommodating portion 8 accommodating the FPC extra length portion 41. The pitch absorbing portion 7 and the FPC accommodating portion 8 are arranged in the width direction Y of the busbar module 10.

As illustrated in FIGS. 7A and 7B, the pitch absorbing portion 7 includes: an absorbing portion body 70; and a pair of first-side plate portions 71, 71 in a flat plate shape continuous to the absorbing portion body 70 and the shaft support portions 62.

As illustrated in FIG. 7A, the absorbing portion body 70 includes multiple first-side arcuate portions 7A. Each of the first-side arcuate portions 7A is formed in an arc shape protruding toward the lower side Z2. In the absorbing portion body 70, the multiple first-side arcuate portions 7A are arranged spaced apart from each other in the width direction Y. Specifically, first-side slits 7B are formed between the multiple first-side arcuate portions 7A to reduce the rigidity of the absorbing portion body 70. According to this configuration, the absorbing portion body 70 is configured to elastically deform (expand and contract) with a small force.

As illustrated in FIGS. 7A and 7B, the FPC accommodating portion 8 includes: an accommodating portion body 80 accommodating the FPC extra length portion 41: and a pair of second-side plate portions 81, 81 in a flat plate shape continuous to the accommodating portion body 80 and the shaft support portions 62.

As illustrated in FIG. 7B, the accommodating portion body 80 is configured to include multiple second-side arcuate portions 8A. Each of the second-side arcuate portions 8A is formed in an arc shape protruding toward the lower side Z2. The circumferential length of the accommodating portion body 80 is formed to be longer than the length of the FPC extra length portion 41, and when the busbar module 10 is in the expanded state, the FPC extra length portion 41 can be accommodated in the accommodating portion body 80. In the accommodating portion body 80, multiple second-side arcuate portions 8A are arranged spaced apart from each other in the width direction Y. Specifically, second-side slits 8B are formed between the multiple second-side arcuate portions 8A.

This accommodating portion body 80 is provided at a position facing the FPC guiding portion 32 in the upper-and-lower direction Z when the busbar module 10 is in the expanded state. Specifically, the FPC extra length portion 41 pushed by the FPC guiding portion 32 to the lower side Z2 is accommodated in the accommodating portion body 80 while it is curved in an arc shape.

The shaft support portions 62 are formed in a C shape capable of pivotally supporting the shafts 50, 50, and are provided to extend in the width direction Y of the busbar module 10.

In order to connect the first divided case 2A and the second divided case 2B by the first connection structure 5A, the pair of shaft support portions 62, 62 provided on the connecting portion 6 are brought into proximity with the pair of shafts 50, 50. The shaft support portions 62 fit in the respective shafts 50, and the shaft support portions 62 are pivotally supported by the respective shafts 50. Accordingly, the first divided case 2A and the second divided case 2B are rotatably connected by the first connection structure 5A. Likewise, in order to connect the second divided case 2B and the third divided case 2C by the second connection structure 5B, the pair of shaft support portions 62, 62 provided on the connecting portion 6 are brought into proximity with the pair of shafts 50, 50. Accordingly, the second divided case 2B and the third divided case 2C are rotatably connected by the second connection structure 5B.

As illustrated in FIG. 1, the case 12 is provided with: a valley fold restriction portion 9A (a first rotation restriction portion) for restricting the rotation direction of the first divided case 2A and the second divided case 2B; and a mountain fold restriction portion 9B (a second rotation restriction portion) for restricting the rotation direction of the second divided case 2B and the third divided case 2C. The mountain fold restriction portion 9B restricts rotation in a direction opposite to the valley fold restriction portion 9A. According to this configuration, when the busbar module 10 is changed from the expanded state to the folded state, rotation in an unintended direction can be restricted.

As illustrated in FIG. 1, the valley fold restriction portion 9A is provided on an end portion on a side opposite to the first connection structure 5A in the width direction Y of the busbar module 10 and at a position adjacent to the first connection structure 5A in the longitudinal direction X of the busbar module 10.

Figure 8A:
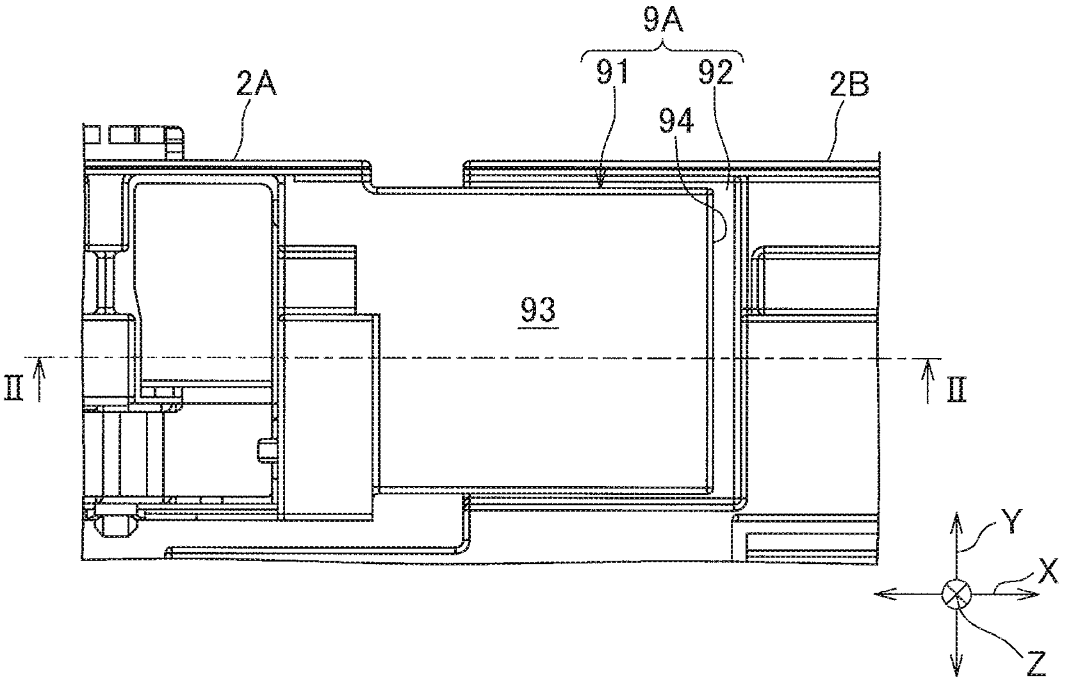
FIG. 8A is a top view illustrating a valley fold restriction portion (first rotation restriction portion) constituting the busbar module.
Figure 8B:
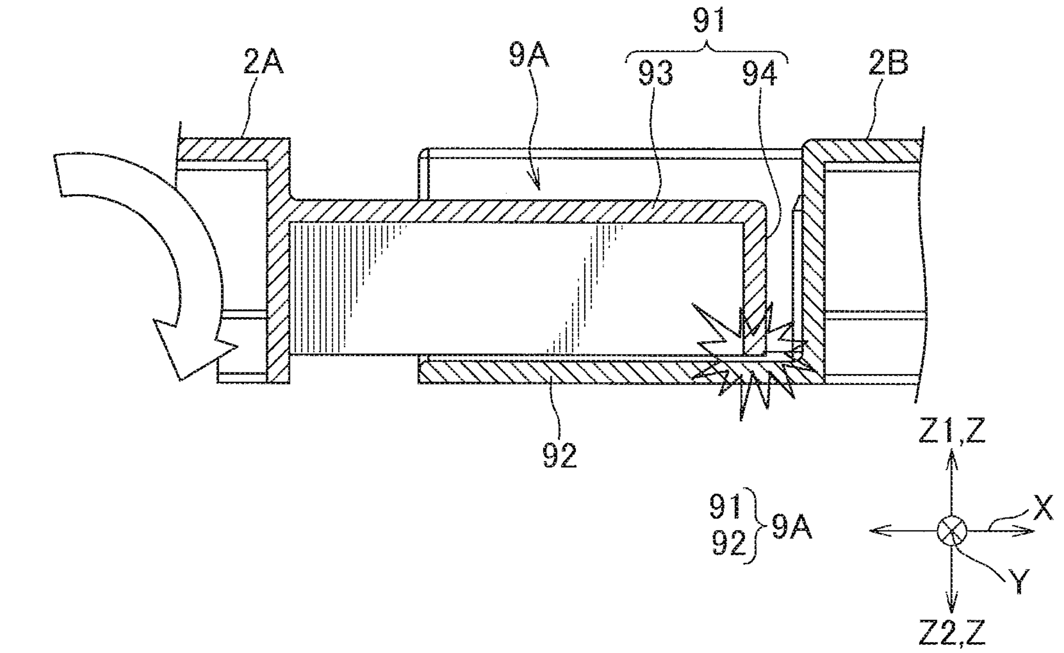
FIG. 8B is a cross-sectional view taken along line II-II of FIG. 8A.

As illustrated in FIGS. 8A and 8B, the valley fold restriction portion 9A includes: a valley fold first restriction piece 91 in an L shape protruding from the first divided case 2A toward the second divided case 2B: and a valley fold second restriction piece 92 which is provided to protrude from the second divided case 2B toward the first divided case 2A and with which the valley fold first restriction piece 91 comes into contact.

As illustrated in FIG. 8B, the valley fold first restriction piece 91 is configured in an L shape that includes: a valley fold facing portion 93 protruding from the first divided case 2A toward the second divided case 2B; and a valley fold extension portion 94 extending toward the lower side Z2 upon bending from the end portion of the valley fold facing portion 93.

As illustrated in FIG. 8B, when the busbar module 10 is in the expanded state, the valley fold restriction portion 9A is provided such that the valley fold facing portion 93 of the valley fold first restriction piece 91 faces the upper side Z1 of the valley fold second restriction piece 92 and the valley fold extension portion 94 can come into contact with the valley fold second restriction piece 92.

As illustrated in FIGS. 8A and 8B, when the busbar module 10 is in an expanded state, the valley fold extension portion 94 of the valley fold first restriction piece 91 comes into contact with the valley fold second restriction piece 92 so that the valley fold restriction portion 9A restricts the first divided case 2A and the second divided case 2B from rotating into a valley shape in which the top surfaces of the first divided case 2A and the second divided case 2B come into proximity with each other, and permits the first divided case 2A and the second divided case 2B to rotate into a mountain shape in which the bottom surfaces of the first divided case 2A and the second divided case 2B come into proximity with each other.

As illustrated in FIG. 1, the mountain fold restriction portion 9B is provided on an end portion on a side opposite to the second connection structure 5B in the width direction Y of the busbar module 10 and at a position adjacent to the second connection structure 5B in the longitudinal direction X of the busbar module 10.

Figure 9A:
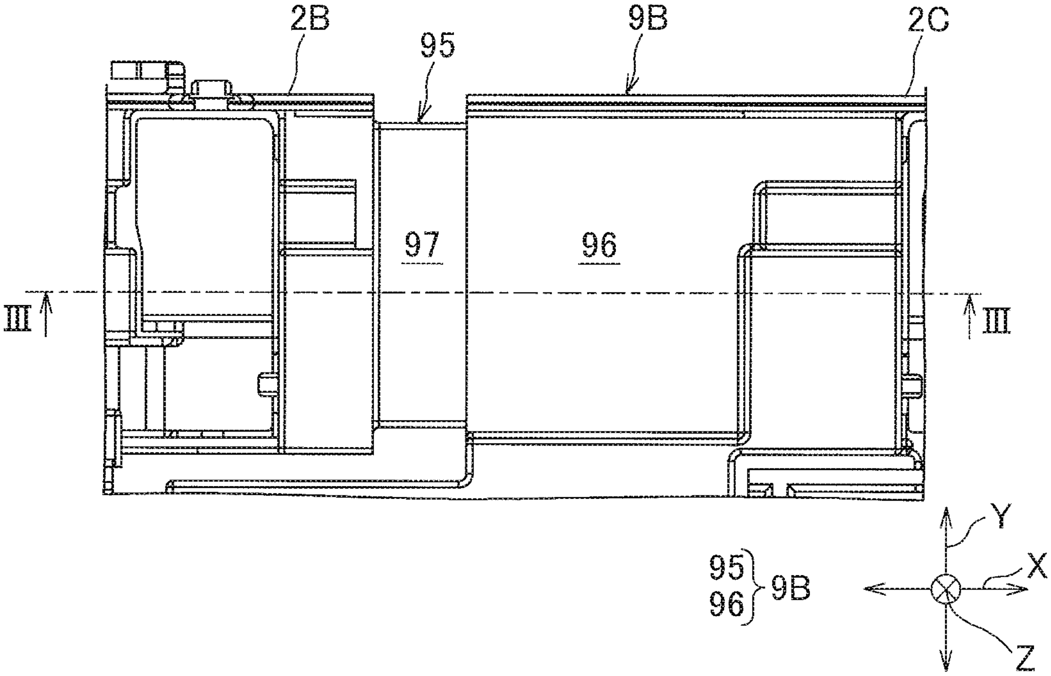
FIG. 9A is a top view illustrating a mountain fold restriction portion (second rotation restriction portion) constituting the busbar module.
Figure 9B:
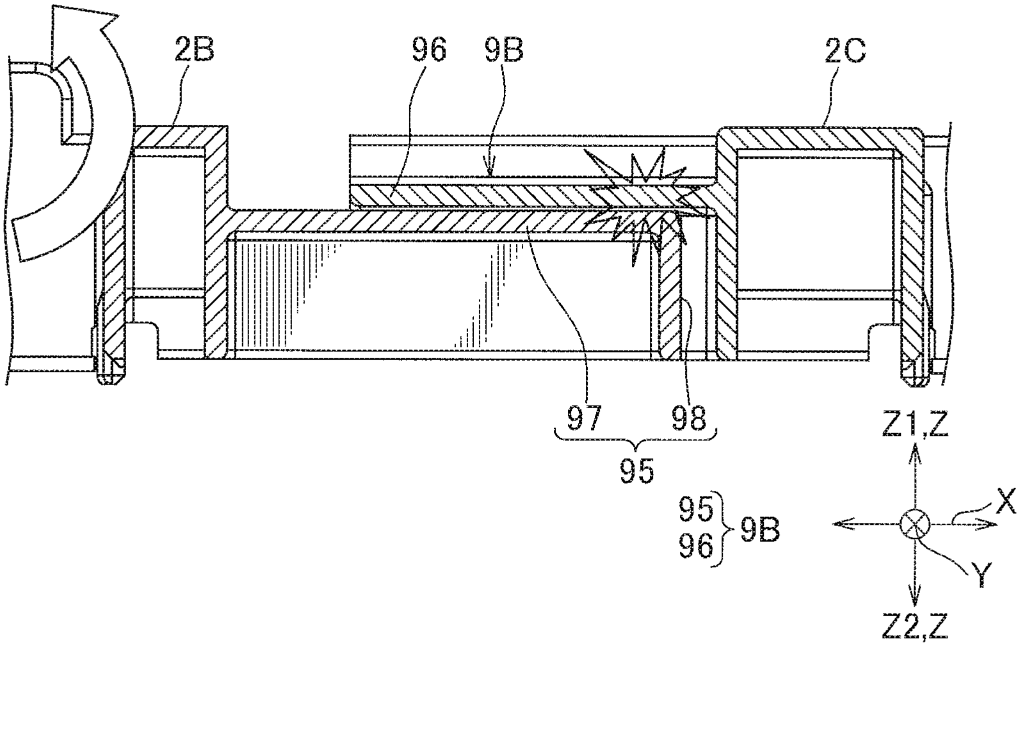
FIG. 9B is a cross-sectional view taken along line III-III of FIG. 9A.

As illustrated in FIGS. 9A and 9B, the mountain fold restriction portion 9B includes: a mountain fold first restriction piece 95 in an L shape protruding from the second divided case 2B toward the third divided case 2C; and a mountain fold second restriction piece 96 which is provided to protrude from the third divided case 2C toward the second divided case 2B and with which the mountain fold first restriction piece 95 comes into contact.

As illustrated in FIG. 9B, the mountain fold first restriction piece 95 is configured in an L shape that includes: a mountain fold facing portion 97 protruding from the second divided case 2B toward the third divided case 2C; and a mountain fold extension portion 98 extending toward the lower side Z2 upon bending from the end portion of the mountain fold facing portion 97.

As illustrated in FIG. 9B, when the busbar module 10 is in the expanded state, the mountain fold restriction portion 9B is provided such that the mountain fold facing portion 97 of the mountain fold first restriction piece 95 faces the lower side Z2 of the mountain fold second restriction piece 96 and the mountain fold first restriction piece 95 can come into contact with the mountain fold second restriction piece 96.

As illustrated in FIGS. 9A and 9B, when the busbar module 10 is in an expanded state, the mountain fold first restriction piece 95 comes into contact with the mountain fold second restriction piece 96 so that the mountain fold restriction portion 9B restricts the second divided case 2B and the third divided case 2C from rotating into a mountain shape in which the bottom surfaces of the second divided case 2B and the third divided case 2C come into proximity with each other, and permits the second divided case 2B and the third divided case 2C to rotate into a valley shape in which the top surfaces of the second divided case 2B and the third divided case 2C come into proximity with each other.

In order to assemble the busbar module 10, the busbars are accommodated in the respective busbar accommodating portions 22A of each of the divided cases 2. The pair of shaft support portions 62, 62 provided on the connecting portion 6 of the first connection structure 5A are brought into proximity with the pair of shafts 50, 50. Accordingly, the shaft support portions 62 fit in the respective shafts 50, so that the shaft support portions 62 are pivotally supported by the respective shafts 50, and the first divided case 2A and the second divided case 2B are connected. Furthermore, the pair of shaft support portions 62, 62 provided on the connecting portion 6 of the second connection structure 5B are brought into proximity with the pair of shafts 50, 50. Accordingly, the shaft support portions 62 fit in the respective shafts 50, so that the shaft support portions 62 are pivotally supported by the respective shafts 50, and the second divided case 2B and the third divided case 2C are connected.

Therefore, the FPC portions 40 of the FPC 4 are routed through the FPC routing portions 23 of the divided cases 2A, 2B, 2C, and the FPC covers 3 are attached to the FPC routing portions 23. As a result, the assembly of the busbar module 10 is completed. In the busbar module 10 in the assembled state, the FPC 4 is routed to extend through the divided cases 2A, 2B, 2C, and the FPC portions 40 of the FPC 4 are electrically connected to the busbars accommodated in the busbar accommodating portions 22A.

As illustrated in FIG. 1, when the busbar module 10 is in the expanded state, the first divided case 2A, the second divided case 2B and the third divided case 2C are connected with each other by the connection structures 5A, 5B and are situated on the same plane as each other. In the expanded state, the pitch absorbing portion 7 constituting each of the connection structures 5A, 5B is in a natural state in which the pitch absorbing portion 7 is not elastically deformed before attachment to the battery assembly, and the FPC extra length portion 41 curves so as to protrude toward the lower side Z2 and is accommodated in the FPC accommodating portion 8.

Furthermore, when the busbar module 10 is in the expanded state, the valley fold first restriction piece 91 of the valley fold restriction portion 9A is provided at a position in contact with or a position in proximity to (i.e., a position capable of coming into contact with) the valley fold second restriction piece 92, and the mountain fold first restriction piece 95 of the mountain fold restriction portion 9B is provided at a position in contact with or a position in proximity to (i.e., a position capable of coming into contact with) the mountain fold second restriction piece 96.

Next, in order to change the busbar module 10 from the expanded state to the folded state, the first divided case 2A and the second divided case 2B are rotated into a mountain fold shape at the first connection structure 5A. At this occasion, the valley fold restriction portion 9A restricts the first divided case 2A and the second divided case 2B from rotating into a valley fold shape. As the rotation proceeds, the bottom surfaces of the first divided case 2A and the second divided case 2B are brought into proximity with each other, and the second divided case 2B is overlaid on the lower side Z2 of the first divided case 2A.

Furthermore, the second divided case 2B and the third divided case 2C are rotated into a valley fold shape at the second connection structure 5B. At this occasion, the mountain fold restriction portion 9B restricts the second divided case 2B and the third divided case 2C from rotating into a mountain fold shape. As the rotation proceeds, the upper surfaces of the second divided case 2B and the third divided case 2C are brought into proximity with each other, and third divided case 2C is overlaid on the lower side Z2 of the second divided case 2B. In this way, the busbar module 10 changes to the folded state.

Next, in order to attach the busbar module 10 with the upper surface of the battery assembly, when the busbar module 10 is in the folded state, an end portion 2Ca of the third divided case 2C is brought into proximity with a reference position situated at one end of the battery assembly in the longitudinal direction X to perform positioning (positioning step). As a result, the third divided case 2C is installed on the upper surface of the battery assembly.

Thereafter, at the second connection structure 5B, the second divided case 2B is rotated so as to move away from the third divided case 2C, and at the first connection structure 5A, the first divided case 2A is rotated so as to move away from the second divided case 2B.

As the rotation proceeds, the FPC guiding portions 32 of the FPC cover 3 come into contact with the FPC extra length portion 41, and the FPC extra length portion 41 is pushed by the FPC guiding portions 32 toward the lower side Z2. Accordingly, the FPC extra length portions 41 are curved toward the lower side Z2 to be accommodated in the FPC accommodating portion 8. As the rotation further proceeds, the second divided case 2B and the first divided case 2A are brought into proximity with the upper surface of the battery assembly. Thereafter, the second divided case 2B is installed at a predetermined position of the battery assembly, and the first divided case 2A is installed at a predetermined position of the battery assembly (installing step). At this occasion, the pitch absorbing portions 7 of the connection structures 5A, 5B elastically deform to expand or contract in the longitudinal direction X, so that the pitch absorbing portion 7 absorbs manufacturing variation of arrangement pitches of electrodes between single cells. Thereafter, the busbars and the electrodes of the single cells are electrically connected, and the busbars are covered with the insulating cover 21. In this manner, the attachment of the busbar module 10 to the battery assembly is completed.

According to the above-described embodiment, each of the connection structures 5A, 5B is configured to displace the plurality of divided cases 2 into: a folded state in which the divided cases 2A, 2B, 2C are rotated so that the adjacent divided cases of the plurality of divided cases 2A, 2B, 2C overlap each other: and an expanded state in which the plurality of divided cases 2A, 2B, 2C are situated on a same plane. According to this configuration, with the connection structures 5A, 5B, the plurality of divided cases 2A, 2B, 2C can be made into the folded state in which the plurality of divided cases 2A, 2B, 2C overlap each other, so that the packaging size in the folded state can be reduced. Accordingly, the increase in the transportation costs and the like can be alleviated.

Furthermore, the busbar module 10 is provided such that, in the folded state, the first divided case 2A, the second divided case 2B, and the third divided case 2C are arranged to overlap in this order in a Z shape toward the lower side Z2 (in a direction to approach the battery assembly, i.e., the third divided case being disposed closest to the battery assembly). According to this configuration, when the busbar module 10 is installed on the battery assembly, the third divided case 2C is brought into proximity with the battery assembly while still in the folded state, and the busbar module 10 is installed on the battery assembly using the end portion 2Ca of the third divided case 2C as a reference of positioning with respect to the battery assembly, so that the busbar module 10 can be installed on the battery assembly with a higher work efficiency.

Furthermore, the case 12 includes: the valley fold restriction portion 9A (first rotation restriction portion) for restricting the rotation direction of the first divided case 2A and the second divided case 2B; and the mountain fold restriction portion 9B (second rotation restriction portion) for restricting the rotation direction of the second divided case 2B and the third divided case 2C, and the mountain fold restriction portion 9B restricts rotation in a direction opposite to the valley fold restriction portion 9A. According to this configuration, when the busbar module 10 is changed from the expanded state to the folded state, rotation in an unintended direction can be restricted.

Furthermore, the connecting portion 6 includes the pitch absorbing portion 7 capable of expanding or contracting in the longitudinal direction X of the busbar module 10 (in a direction in which the single cells are arranged), the pitch absorbing portion 7 includes the multiple first-side arcuate portions 7A (absorbing members) protruding toward the lower side Z2 (toward the battery assembly) in the expanded state, and the multiple first-side arcuate portions 7A are provided to be spaced apart from each other by an interval (the first-side slits 7B). Specifically, the first-side slits 7B are formed between the multiple first-side arcuate portions 7A to reduce the rigidity of the absorbing portion body 70. According to this configuration, when the busbar module 10 in the expanded state is installed on the battery assembly, the pitch absorbing portion 7 elastically deforms in the longitudinal direction X of the busbar module 10 to expand or contract in the longitudinal direction X, so that the pitch absorbing portion 7 absorbs manufacturing variation of arrangement pitches of electrodes between single cells. Furthermore, the pitch absorbing portion 7 is provided with the first-side slits 7B between the multiple first-side arcuate portions 7A, which enables the pitch absorbing portion 7 to deform (expand or contract) with a small force, and therefore, while manufacturing variation is absorbed, the busbar module 10 can be installed on the battery assembly with a higher work efficiency.

Furthermore, the connecting portion 6 includes a FPC accommodating portion 8 (routing material accommodating portion) capable of accommodating the FPC extra length portion 41, and the FPC accommodating portion 8 is formed in an arc shape to protrude toward the lower side Z2 (toward the battery assembly) in the expanded state. According to this configuration, when the busbar module 10 is in the expanded state, the FPC extra length portion 41 of the FPC 4 is accommodated in the FPC accommodating portion 8, so that the FPC extra length portion 41 does not interfere with other components, and the FPC extra length portion 41 can be protected.

Furthermore, the FPC cover 3 includes: the cover body 31 in a plate shape: and the FPC guiding portion 32 (guiding portion) provided on an end portion of the cover body 31 to guide the FPC extra length portion 41 (extra length portion) into the FPC accommodating portion 8 (routing material accommodating portion), wherein the FPC guiding portion 32 is formed to bend toward the FPC accommodating portion 8 from the cover body 31, and when displacing from the folded state to the expanded state, the FPC guiding portion 32 comes into contact with the FPC extra length portion 41 to guide the FPC extra length portion 41 into the FPC accommodating portion 8. According to this configuration, the FPC guiding portion 32 pushes the FPC extra length portion 41, so that the FPC extra length portion 41 can be accommodated in the FPC accommodating portion 8.

A busbar module attachment method for attaching the busbar module 10 to the battery assembly, comprising:

a positioning step of, in the folded state, positioning the busbar module 10 by bringing the end portion 2Ca of the third divided case 2C into proximity with an end portion of the battery assembly; and an installing step of, in a state in which the busbar module 10 is positioned on the battery assembly, rotating the second divided case 2B and the first divided case 2A about the pair of connection structures 5A, 5B to install the second divided case 2B and the first divided case 2A on the battery assembly. According to this configuration, when the busbar module 10 is installed on the battery assembly, the third divided case 2C is brought into proximity with the battery assembly while still in the folded state, and the busbar module 10 is installed on the battery assembly using the end portion 2Ca of the third divided case 2C as a reference of positioning with respect to the battery assembly, so that the busbar module 10 can be installed on the battery assembly with a higher work efficiency.

Note that the present invention is not limited to the above-described embodiment, and includes other configurations that can achieve the object of the present invention, and the present invention also includes modifications as explained below.

Figure 10:
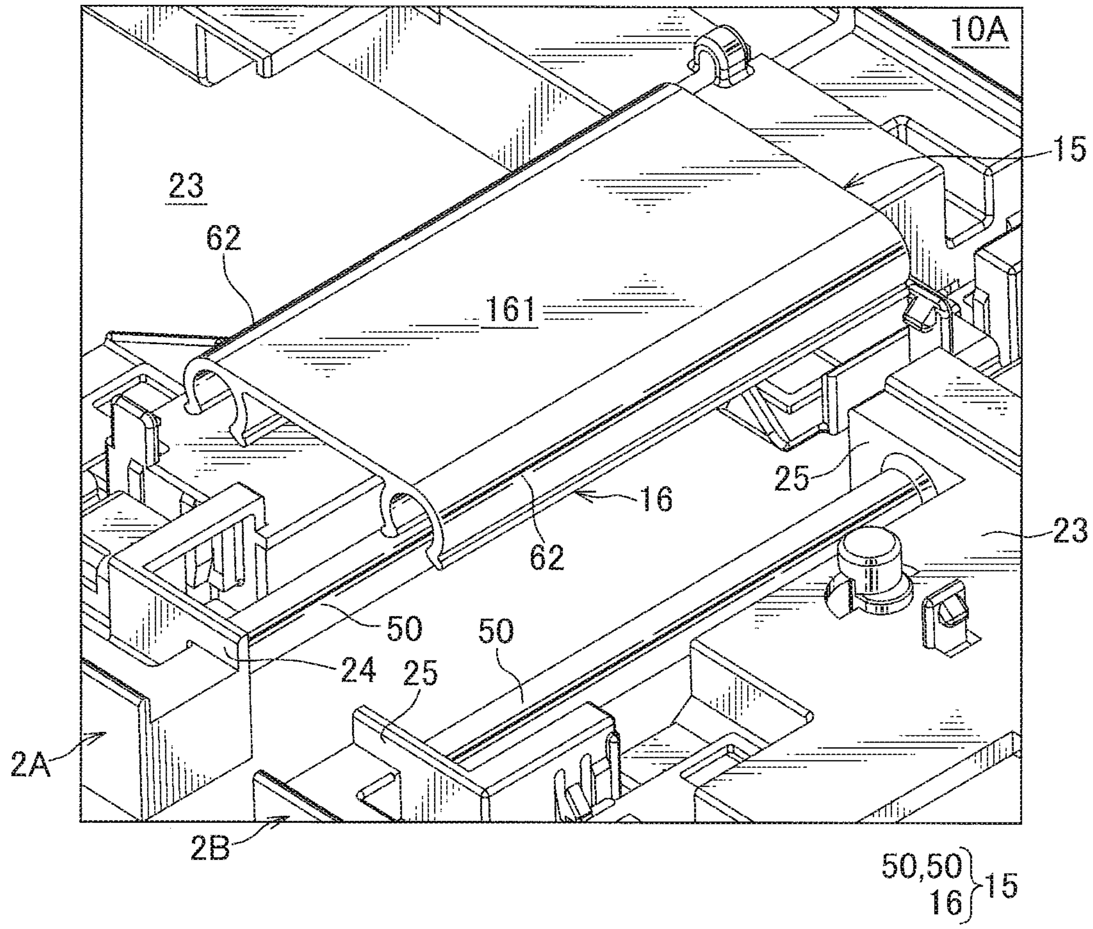
FIG. 10 is a perspective view illustrating a modification of the busbar module.
Figure 11:
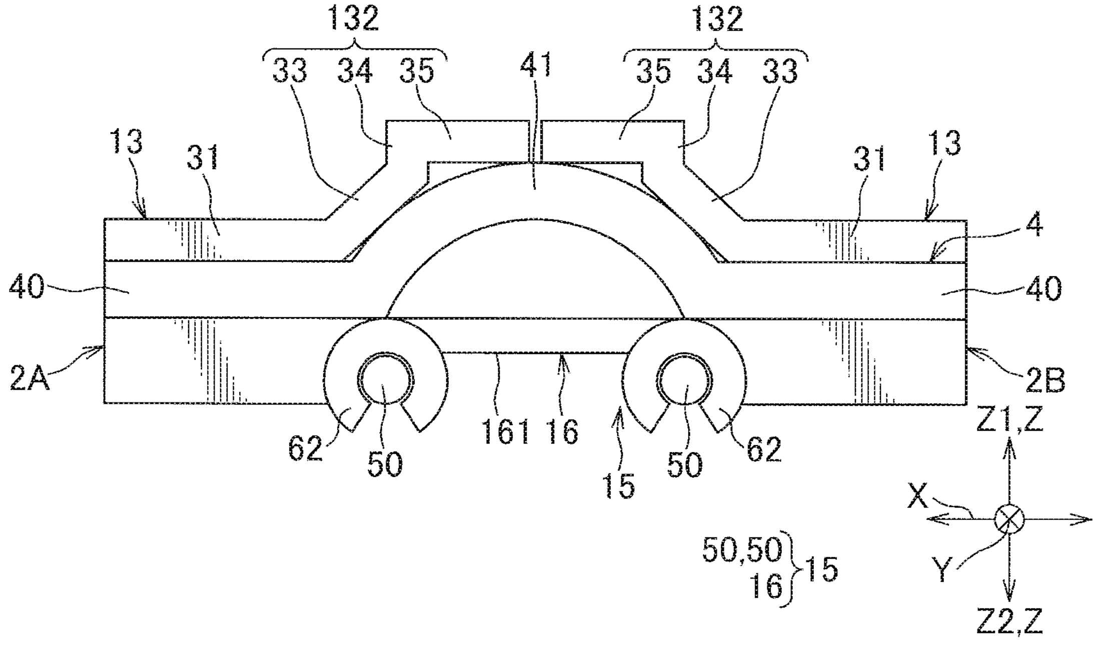
FIG. 11 is a conceptual diagram illustrating the expanded state of the busbar module illustrated in FIG. 10.

In the above-described embodiment the connecting portion body 61 of the connecting portion 6 is configured to include the pitch absorbing portion 7 that can deform in the longitudinal direction X of the busbar module 10 and the FPC accommodating portion 8 configured to accommodate the FPC extra length portion 41, but the present invention is not limited thereto. As illustrated in FIG. 10, in a busbar module 10A, a connection structure 15 may include shafts 50, 50 constituting a pair provided on adjacent divided cases 2A (2), 2B (2), respectively and connecting portions 16 pivotally supported by the shafts 50, 50. FIG. 10 is a perspective view illustrating a modification of the busbar module 10. FIG. 11 is a conceptual diagram illustrating the expanded state of the busbar module 10A. In FIG. 10, the FPC 4 and the FPC cover 3 are omitted.

As illustrated in FIG. 10, one of the shafts 50, 50 constituting the pair is supported by a pair of first protruding piece 24, 24 (only one of which is illustrated in FIG. 10) protruding from the first divided case 2A and is provided to extend in the width direction Y of the busbar module 10, and the other of the shafts 50, 50 constituting the pair is supported by a pair of second protruding piece 25, 25 protruding from the second divided case 2B and is provided to extend in the width direction Y.

As illustrated in FIG. 10, a connecting portion body 161 constituting the connecting portion 16 may be formed in a flat plate shape. In this case, in the expanded state of the busbar module 10A, a pair of shaft support portions 62, 62 may be provided on the lower side Z2 (a side closer to the battery assembly) of the connecting portion body 161. According to this configuration, a mechanism for displacing the divided cases 2A, 2B, 2C into either a folded state in which the multiple divided cases 2A, 2B, 2C overlap each other or an expanded state in which the multiple divided cases 2A, 2B, 2C are situated on a same plane can be achieved.

Furthermore, as illustrated in FIG. 11, when the connecting portion body 161 is formed in a flat plate shape, a FPC protection portion 132 (protection portion) is provided at a position facing the FPC extra length portion 41 when the busbar module 10A is in the expanded state, and the FPC protection portion 132 can cover the FPC extra length portion 41 while the FPC extra length portion 41 is curved toward the upper side Z1 (i.e, in a direction away from the battery assembly). Specifically, as illustrated in FIG. 11, the FPC protection portion 132 may include a diagonal extension portion 33 that is continuous to the cover body 131, a standing portion 34 that is continuous to the diagonal extension portion 33 and that stands toward the upper side Z1, and a cover facing portion 35 that is continuous to the standing portion 34 and that faces the connecting portion body 161. According to this configuration, when the busbar module 10A is in the expanded state, the FPC extra length portion 41 is covered with the FPC protection portions 132 of adjacent divided cases 2A, 2B, so that the FPC extra length portion 41 does not interfere with other components, and the FPC extra length portion 41 can be protected.

Furthermore, in the above-described embodiment, the connection structures 5A, 5B include the pair of shafts 50, 50 and the connecting portion 6 pivotally supported by the pair of shafts 50, 50, and adjacent divided cases 2, 2 are rotated by the two axes, but the present invention is not limited thereto. Each connection structure may include one shaft provided on a first divided case 2 and a connecting portion pivotally supported by the one shaft. In this case, one end of the connecting portion may be pivotally supported by the shaft, and the other end thereof may be non-rotatably fixed to a second divided case 2, so that a divided case situated at the one end side of the connecting portion is rotated by one axis. Alternatively, each connection structure may be configured in a hinge manner, including one shaft extending in the width direction Y and a pair of connecting portions pivotally supported by the one shaft. In this case, one end of each connecting portion may be pivotally supported by the one shaft, the other ends of the connecting portions may be non-rotatably fixed to the divided cases 2, 2, so that the adjacent divided cases 2, 2 are rotated by one axis.

In the above-described embodiment, the routing material is constituted by the FPC 4, but the present invention is not limited thereto. The routing material may be constituted by coated wires.

Furthermore, the best configuration, method, and the like for carrying out the present invention have been disclosed in the above description, but the present invention is not limited thereto. That is, although the present invention has been particularly illustrated and described primarily with respect to the specific embodiment, a person skilled in the art would be able to make various modifications to the embodiment described above in terms of shape, material, quantity, and other detailed configurations, without deviating from the scope of the technical idea and purpose of the present invention. Therefore, recitations that limit the shape, material, and the like disclosed above are provided as examples to facilitate understanding of the present invention, and are not intended to limit the present invention. Accordingly, recitations of names of members that exclude some or all of the limitations such as a shape, material, and the like are included in the present invention.

LIST OF REFERENCE SIGNS

10, 10A busbar module
12 case
2A (2) first divided case
2B (2) second divided case
2C (2) third divided case
2Ca end portion of third divided case
9A valley fold restriction portion (first rotation restriction portion)
9B mountain fold restriction portion (second rotation restriction portion)
3, 13 FPC cover (routing material cover)
31 cover body
32 FPC guiding portion (guiding portion)
132 protection portion (protection portion)
4 FPC (routing material)
40 a plurality of FPC portions (routing material portions)
41 FPC extra length portion (extra length portion)
5A (5) first connection structure (connection structure)
5B (5) second connection structure (connection structure)
15 connection structure
50, 50 a pair of shafts
6, 16 connecting portion
61, 161 connecting portion body
62, 62 a pair of shaft support portion
7 pitch absorbing portion
7A first-side arcuate portion (absorbing member)
7B first-side slit (interval)
8 FPC accommodating portion (routing material accommodating portion)
X longitudinal direction of busbar module (direction in which single cells are arranged)
Z1 upper side (direction away from battery assembly)
Z2 lower side (side that is closer to battery assembly)

What is claimed is:

1. A busbar module configured to be attached to a battery assembly including a plurality of single cells, comprising:
a case configured to be installed on the battery assembly;
a plurality of busbars supported by the case and configured to be respectively connected to the plurality of single cells; and
a routing material electrically connected to the busbars and routed in the case,
wherein the case includes:
a plurality of divided cases that are divided in a direction in which the single cells are arranged; and
at least one connection structure rotatably connecting adjacent divided cases of the plurality of divided cases with each other,
wherein the at least one connection structure is configured to displace the plurality of divided cases into:
a folded state in which the divided cases are rotated so that the adjacent divided cases of the plurality of divided cases overlap each other; and an expanded state in which the plurality of divided cases are situated on a same plane, wherein a connection structure from among the at least one connection structure includes:

a pair of shafts respectively provided on the adjacent divided cases of the plurality of divided cases; and a connecting portion pivotally supported by the pair of shafts.

2. The busbar module according to claim 1, wherein the plurality of divided cases include a first divided case, a second divided case, and a third divided case, the at least one connection structure comprises a pair of connection structures, the first divided case, the second divided case, and the third divided case are connected in this order by the pair of connection structures, and in the folded state, the first divided case, the second divided case, and the third divided case are arranged to overlap in this order in a Z shape, with the third divided case being disposed closest to the battery assembly.

3. The busbar module according to claim 2, wherein the case includes:

a first rotation restriction portion for restricting a rotation direction of the first divided case and the second divided case; and a second rotation restriction portion for restricting a rotation direction of the second divided case and the third divided case, and the second rotation restriction portion restricts rotation in a direction opposite to the first rotation restriction portion.

4. A busbar module attachment method for attaching the busbar module according to claim 2 to the battery assembly, comprising:

a positioning step of, in the folded state, positioning the busbar module by bringing an end portion of the third divided case away from the second divided case into proximity with an end portion of the battery assembly; and an installing step of, in a state in which the busbar module is positioned on the battery assembly, rotating the second divided case and the first divided case about the pair of connection structures to install the second divided case and the first divided case on the battery assembly.

5. The busbar module according to claim 1, wherein the connecting portion includes a pitch absorbing portion that can elastically deform in the direction in which the single cells are arranged, the pitch absorbing portion includes a plurality of absorbing members protruding toward the battery assembly in the expanded state, and the plurality of absorbing members are arranged spaced apart from each other.

6. The busbar module according to claim 5, wherein the routing material includes:

a plurality of routing material portions routed through the respective divided cases; and an extra length portion provided between two of the plurality of routing material portions and facing the connection structure, wherein the connecting portion includes a routing material accommodating portion in an arc shape capable of accommodating the extra length portion, and the routing material accommodating portion is configured to protrude toward the battery assembly in the expanded state.

7. The busbar module according to claim 6, further comprising:

a routing material cover supported by a divided case of the plurality of divided cases and configured to cover at least a routing material portion from among the plurality of routing material portions, wherein the routing material cover includes:

a cover body in a plate shape; and a guiding portion provided on an end portion of the cover body to push the extra length portion into the routing material accommodating portion, wherein the guiding portion is formed to bend toward the routing material accommodating portion from the cover body, and wherein when displacing from the folded state to the expanded state, the guiding portion comes into contact with the extra length portion to push the extra length portion into the routing material accommodating portion.

8. The busbar module according to claim 1, wherein the routing material includes:

a plurality of routing material portions routed through the respective divided cases; and an extra length portion provided between two of the plurality of routing material portions and facing the connection structure, wherein the connecting portion includes a routing material accommodating portion in an arc shape capable of accommodating the extra length portion, and the routing material accommodating portion is configured to protrude toward the battery assembly in the expanded state.

9. The busbar module according to claim 8, further comprising:

a routing material cover supported by a divided case of the plurality of divided cases and configured to cover at least a routing material portion from among the plurality of routing material portions, wherein the routing material cover includes:

a cover body in a plate shape; and a guiding portion provided on an end portion of the cover body to push the extra length portion into the routing material accommodating portion, wherein the guiding portion is formed to bend toward the routing material accommodating portion from the cover body, and wherein when displacing from the folded state to the expanded state, the guiding portion comes into contact with the extra length portion to push the extra length portion into the routing material accommodating portion.

10. The busbar module according to claim 1, wherein the connecting portion includes:

a connecting portion body; and a pair of shaft support portions provided on the connecting portion body and pivotally supported by the pair of shafts, wherein the connecting portion body is formed in a flat plate shape, and the pair of shaft support portions is provided on a side of the connecting portion body closer to the battery assembly in the expanded state.

11. The busbar module according to claim 10, wherein the routing material includes:

a plurality of routing material portions routed through the respective divided cases; and an extra length portion provided between two of the plurality of routing material portions and facing the connection structure, wherein the busbar module comprises:

a routing material cover supported by a divided case of the plurality of divided cases and configured to cover at least a routing material portion from among the plurality of routing material portions, wherein the routing material cover includes:

a cover body in a plate shape; and a protection portion provided on an end portion of the cover body to cover and protect the extra length portion, wherein the protection portion is formed to bend in a direction to separate from the connecting portion body, and is configured to cover the extra length portion in the expanded state.

* * * * *